(12) United States Patent
Marcus

(10) Patent No.: US 7,647,683 B1
(45) Date of Patent: Jan. 19, 2010

(54) FITTING ALIGNER

(75) Inventor: Arnold Marcus, Orange, CT (US)

(73) Assignee: Centrum Equities Acquisition LLC, Nashville, TN (US)

( * ) Notice: Subject to any disclaimer, the term of this patent is extended or adjusted under 35 U.S.C. 154(b) by 980 days.

(21) Appl. No.: 11/239,487

(22) Filed: Sep. 29, 2005

Related U.S. Application Data

(63) Continuation-in-part of application No. 11/131,674, filed on May 18, 2005, now Pat. No. 7,594,312.

(51) Int. Cl.
*B23Q 17/00* (2006.01)
*F16L 35/00* (2006.01)

(52) U.S. Cl. ...................... 29/407.09; 285/39

(58) Field of Classification Search ............. 29/407.09, 29/525.02, 525.01, 428, 464, 467, 469; 285/39, 285/90, 92; 411/119, 120
See application file for complete search history.

(56) References Cited

U.S. PATENT DOCUMENTS

| | | | |
|---|---|---|---|
| 1,065,387 A | 6/1913 | Ogg | |
| 4,073,512 A | 2/1978 | Vian et al. | |
| 4,856,946 A | 8/1989 | Park | |
| 5,312,139 A | 5/1994 | Marks et al. | |
| 5,348,349 A | * | 9/1994 | Sloane .................... 285/92 |
| 5,524,936 A | * | 6/1996 | Barr et al. ................. 285/39 |
| 6,276,237 B1 | 8/2001 | Stacy | |
| 6,358,075 B1 | 3/2002 | Tischner | |
| 6,702,536 B2 | 3/2004 | Nilsen | |
| 2003/0184085 A1 | 10/2003 | Thompson | |

* cited by examiner

*Primary Examiner*—John C Hong
(74) *Attorney, Agent, or Firm*—DeLio & Peterson, LLC; Peter W. Peterson

(57) ABSTRACT

A system of aligning and connecting a threaded male fastener to a correspondingly threaded female fastener has a nut having a plurality of upturned sides and a central axis aligned with that of one of the male or female fastener. The system includes a guide sleeve having a cylindrical internal surface and an end sized to fit within the upturned sides of the nut, and a guide member having a cylindrical external surface and a central axis aligned with that of the other of the male or female fastener. The guide member cylindrical external surface is slidingly and rotatably movable with respect to the guide sleeve cylindrical internal surface. The guide sleeve end fits within the upturned sides of the nut and the guide member is adapted to be slid into the guide sleeve, such that the threaded male and female fasteners are coaxially aligned and contacted. The guide member is rotated with respect to the guide sleeve so that threads of the male fastener engage threads of the female fastener.

20 Claims, 7 Drawing Sheets

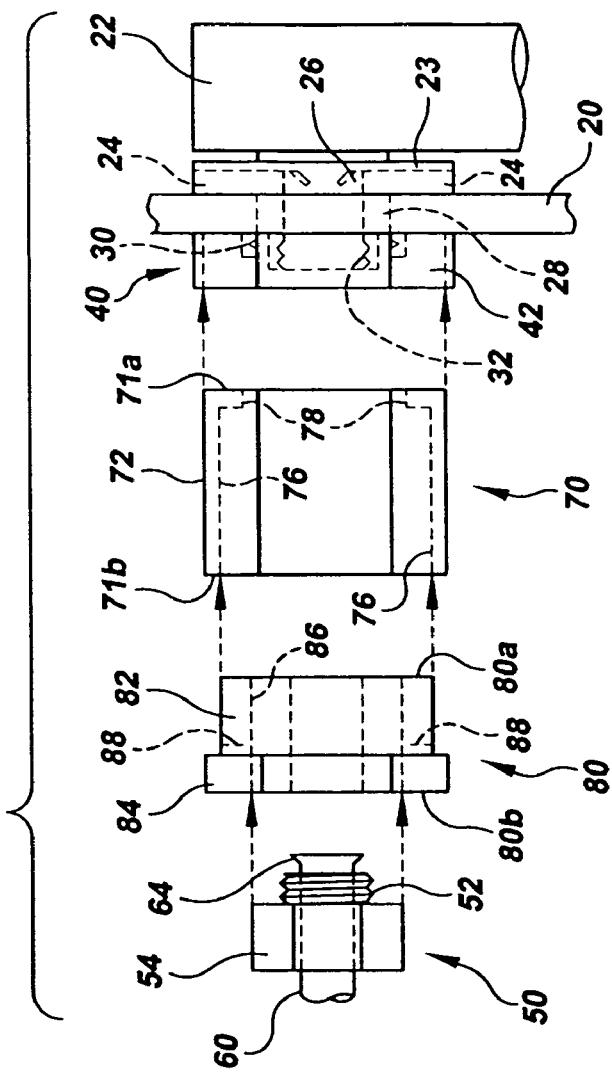
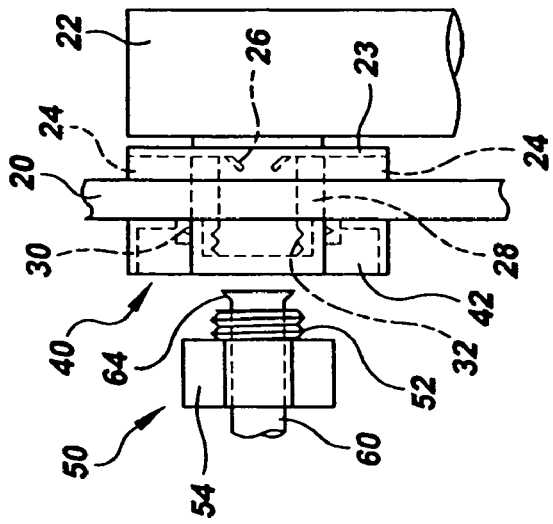
FIG. 2
FIG. 1 (PRIOR ART)

FITTING ALIGNER

This application is a continuation-in-part of U.S. Ser. No. 11/131,674 filed on May 18, 2005.

BACKGROUND OF THE INVENTION

1. Field of the Invention

The present invention relates to heat exchanger connections and, in particular, to a method and system for aligning and connecting transmission oil cooler lines to a motor vehicle radiator containing a transmission oil cooler.

2. Description of Related Art

Replacement radiators for trucks almost always contain a transmission oil cooler installed in one of the coolant tanks of the radiator assembly. When replacing the radiator, the transmission oil lines must first be disconnected from the oil cooler and then reconnected after the replacement radiator is in place. The oil lines use small diameter steel tubing and the fitting on each oil line used to connect it to the oil cooler is also typically steel. The vast majority of oil coolers are brass and since the oil inlet and outlet fittings are brazed to the oil cooler, they too are brass. The remainder of the oil coolers are steel, with steel fittings.

FIG. 1 shows prior art oil cooler 22 mounted within the wall 20 of an otherwise conventional radiator tank. A flange 23, at one end of the cylindrical cooler inlet extension 28, is sealed to the tank wall 20 by gasket 24. Inlet extension tube 28 extending from the flange passes through an opening in the radiator tank wall 20 and has on the free end internal 32 and external 30 threads. The oil cooler 22 is secured to the tank wall 20 by nut 40 which has internal threads which mate with tube extension external threads 30, to hold the oil cooler securely. Nut 40 is typically a Palnut brand threaded fastener (available from Tinnerman Palnut Engineered Products of Brunswick, Ohio), made of formed sheet steel which has hex shaped external sides 42. The oil cooler tube extension 28 further has an inner flared opening 26 which receives and seals to an oil supply line.

As also shown in FIG. 1, oil supply line 60 has a flared end 64 to mate with the flare of oil cooler opening 26. The tubing nut 50 has exterior hex sides 54 and a threaded portion 52 to engage threads 32 inside the oil cooler extension tube 28.

Problems occur when attempting to reconnect the transmission oil lines to the oil cooler with the replacement radiator in place in the vehicle. Because of typically poor accessibility and visibility, in many instances the installer inadvertently does not properly align the fittings on the transmission lines with the corresponding fittings on the oil cooler. Such problems are made worse in the vast majority of the time when one of the fittings is brass (e.g., the one brazed to the oil cooler) and the mating fitting is steel. Since brass is softer than steel, the probability of cross threading on the oil cooler fitting greatly increases. The damage is difficult to repair since it involves the radiator. Even if the oil cooler fitting is steel, cross threading can still occur. If the damaged fitting is an integral part of a large component, as the radiator assembly usually is, then the entire radiator may have to be replaced, or at least removed from the vehicle and the oil cooler professionally replaced, which is both expensive and time consuming.

Consequently, there is a need for a method and system to establish and maintain near perfect alignment between such fittings as the tube fitting is threaded into the oil cooler fitting, to eliminate the high incidence of misaligned threads and the resulting high warranty costs. There is also a need for a means to limit the sealing torque, to prevent thread stripping while still providing the required sealing torque.

SUMMARY OF THE INVENTION

Bearing in mind the problems and deficiencies of the prior art, it is therefore an object of the present invention to provide a method and system for aligning threaded male and female fasteners prior to and during connection.

It is another object of the present invention to provide a method and system for reducing stripping of threaded male and female fasteners during connection thereof.

A further object of the invention is to provide a method and system for aligning an oil line fitting with an oil cooler connection in a motor vehicle radiator.

Still other objects and advantages of the invention will in part be obvious and will in part be apparent from the specification.

The above and other objects, which will be apparent to those skilled in the art, are achieved in the present invention which is directed to a method of aligning and connecting a threaded male fastener to a correspondingly threaded female fastener comprising providing one of the threaded male fastener or correspondingly threaded female fastener with a guide sleeve having a cylindrical internal surface and a central axis aligned with a central axis of the one of the male or female fastener, and providing the other of the threaded male fastener or correspondingly threaded female fastener with a guide member having a cylindrical external surface and a central axis aligned with a central axis of the other of the male or female fastener. The guide member cylindrical external surface is slidingly and rotatably movable with respect to the guide sleeve cylindrical internal surface. The method then includes sliding the guide member into the guide sleeve, such that the threaded male and female fasteners are coaxially aligned, contacting the threaded female fastener with the threaded male fastener, and rotating the guide member with respect to the guide sleeve so that threads of the male fastener engage threads of the female fastener.

In another aspect, the present invention is directed to a system for aligning and connecting a threaded male fastener to a correspondingly threaded female fastener comprising a guide sleeve having a cylindrical internal surface and a central axis adapted to be aligned with a central axis of the one of the male or female fastener, and a guide member having a cylindrical external surface and a central axis adapted to be aligned with a central axis of the other of the male or female fastener. The guide member cylindrical external surface is slidingly and rotatably movable with respect to the guide sleeve cylindrical internal surface. The guide member is adapted to be slid into the guide sleeve, such that the threaded male and female fasteners may be coaxially aligned and contacted, and the guide member may be rotated with respect to the guide sleeve so that threads of the male fastener engage threads of the female fastener.

Preferably, the guide sleeve is non-rotatable with respect to the one of the male or female fastener and the guide member cylindrical external surface is sized to have a sliding fit with respect to the guide sleeve cylindrical internal surface.

The guide sleeve may be provided with a threaded female fastener, optionally integral therewith, and the guide member may be provided with a threaded male fastener. The guide sleeve may be provided with the threaded female fastener on an inlet to a radiator tank, and the guide member may be provided with the threaded male fastener on a line to be secured to the radiator tank inlet.

Also, the guide sleeve may be provided with the threaded female fastener on an inlet to a radiator tank, for example, an inlet for an oil cooler within a radiator tank, the guide sleeve optionally being integral with the radiator tank, and the guide member may be provided with the threaded male fastener on a line to be secured to the radiator tank inlet.

Preferably, the guide sleeve is provided with a threaded female fastener and the guide member is provided with a threaded male fastener having a shaped external surface, for example, a hex-shaped external surface, and the guide member has an internal surface, for example, an internal hex-shaped surface, sized correspondingly to the male fastener shaped external surface. The guide member is axially slideable with respect to the male fastener and, upon rotation of the guide member, the guide member rotation is imparted to the male fastener to engage the threads of the female fastener.

The guide member may be provided with a threaded male fastener and the guide sleeve may be provided with a threaded female fastener having a shaped surface, for example, a hex-shaped surface, and the guide sleeve may have a surface, for example, a hex-shaped external surface, sized correspondingly to the female fastener shaped surface such that the guide sleeve may be non-rotatably secured to the female fastener.

In one embodiment, the guide member has a cylindrical external surface portion, a hexagonal external surface portion and a hexagonal internal surface portion adapted to be aligned with a hexagonal external surface of the other of the male or female fastener. The guide member hexagonal external surface is sized and configured to be rotated by a wrench and, upon reaching sealing torque of the other of the male or female fastener, the external surface is distorted sufficiently so that the wrench slips, to prevent further torque from being applied to the other of the male or female fastener.

In another embodiment, the guide member has a cylindrical external surface portion, a hexagonal external surface portion and a hexagonal internal surface portion adapted to be aligned with a hexagonal external surface of the other of the male or female fastener. The guide member hexagonal internal surface is sized and configured such that, upon reaching sealing torque of the other of the male or female fastener, the internal surface is distorted sufficiently so that the hexagonal external surface of the other of the male or female fastener slips, to prevent further torque from being applied to the other of the male or female fastener.

In a further embodiment, the guide member has a cylindrical external surface portion, a hexagonal external surface portion and a hexagonal internal surface portion adapted to be aligned with a hexagonal external surface of the other of the male or female fastener. The guide member hexagonal external surface is sized and configured to be rotated by a wrench. The thickness of the guide member between the cylindrical external surface portion and the hexagonal external surface portion is such that, upon reaching sealing torque of the other of the male or female fastener, the guide member between the cylindrical external surface portion and the hexagonal external surface portion shears to prevent further torque from being applied to the other of the male or female fastener.

In yet another aspect, the present invention provides a method of aligning and connecting a threaded male fastener to a correspondingly threaded female fastener comprising providing one of the threaded male fastener or correspondingly threaded female fastener with a nut having a plurality of upturned sides and a central axis aligned with a central axis of the one of the male or female fastener, and providing a guide sleeve having a cylindrical internal surface and a central axis and an end sized to fit within the upturned sides of the nut. The method also includes providing the other of the threaded male fastener or correspondingly threaded female fastener with a guide member having a cylindrical external surface and a central axis aligned with a central axis of the other of the male or female fastener. The guide member cylindrical external surface is slidingly and rotatably movable with respect to the guide sleeve cylindrical internal surface. The method then includes aligning the guide sleeve central axis with a central axis of the one of the male or female fastener nut and inserting the end of the guide sleeve into the nut so that the guide sleeve end fits within the upturned sides of the nut, sliding the guide member into the guide sleeve, such that the threaded male and female fasteners are coaxially aligned, and rotating the guide member with respect to the guide sleeve so that the threads of the male fastener engage threads of the female fastener.

In a related aspect, the present invention provides a system of aligning and connecting a threaded male fastener to a correspondingly threaded female fastener comprising a nut having a plurality of upturned sides and a central axis aligned with a central axis of one of the male or female fastener. The system includes a guide sleeve having a cylindrical internal surface and a central axis and an end sized to fit within the upturned sides of the nut, and a guide member having a cylindrical external surface and a central axis aligned with a central axis of the other of the male or female fastener. The guide member cylindrical external surface is slidingly and rotatably movable with respect to the guide sleeve cylindrical internal surface. The guide sleeve end is adapted to be fitted within the upturned sides of the nut and the guide member is adapted to be slid into the guide sleeve, such that the threaded male and female fasteners are coaxially aligned and contacted. The guide member may be rotated with respect to the guide sleeve so that threads of the male fastener engage threads of the female fastener.

Preferably, the guide sleeve end is shaped to fit within the upturned sides of the nut, and is adapted to be non-rotatably secured to the nut. The guide sleeve end and the upturned sides of the nut may be hexagonal.

The nut may have an inside bottom surface between the upturned sides, so that the guide sleeve end is adapted to contact the inside bottom surface when the end of the guide sleeve is inserted into the nut.

The upturned sides of the nut have a top, and the guide sleeve may have a shoulder on an external surface near the end to be fitted within the upturned sides of the nut, so that the guide sleeve shoulder is adapted to contact the top of the upturned sides of the nut when the end of the guide sleeve is inserted into the nut. The guide sleeve may have a length between the shoulder and the end to be fitted within the upturned sides of the nut less than the distance between the top of the upturned sides of the nut and the inside bottom surface of the nut.

The guide sleeve end may be cylindrical, and the guide sleeve may have a hexagonal external surface or a cylindrical external surface opposite the end adapted to be fitted within the upturned sides of the nut. The guide sleeve may also have a ring extending from an external surface thereof to contact the top of the upturned sides of the nut when the end of the guide sleeve is inserted into the nut.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a side elevational view, partially in cross-section, of the prior art connection of an oil line to an oil cooler mounted in a radiator tank.

FIG. 2 is a side elevational view, partially in cross-section, of the preferred system of the present invention for connecting an oil line to an oil cooler mounted in a radiator tank.

DESCRIPTION OF THE PREFERRED EMBODIMENT(S)

In describing the preferred embodiment of the present invention, reference will be made herein to FIGS. 2-13 of the drawings in which like numerals refer to like features of the invention.

Figure 3:
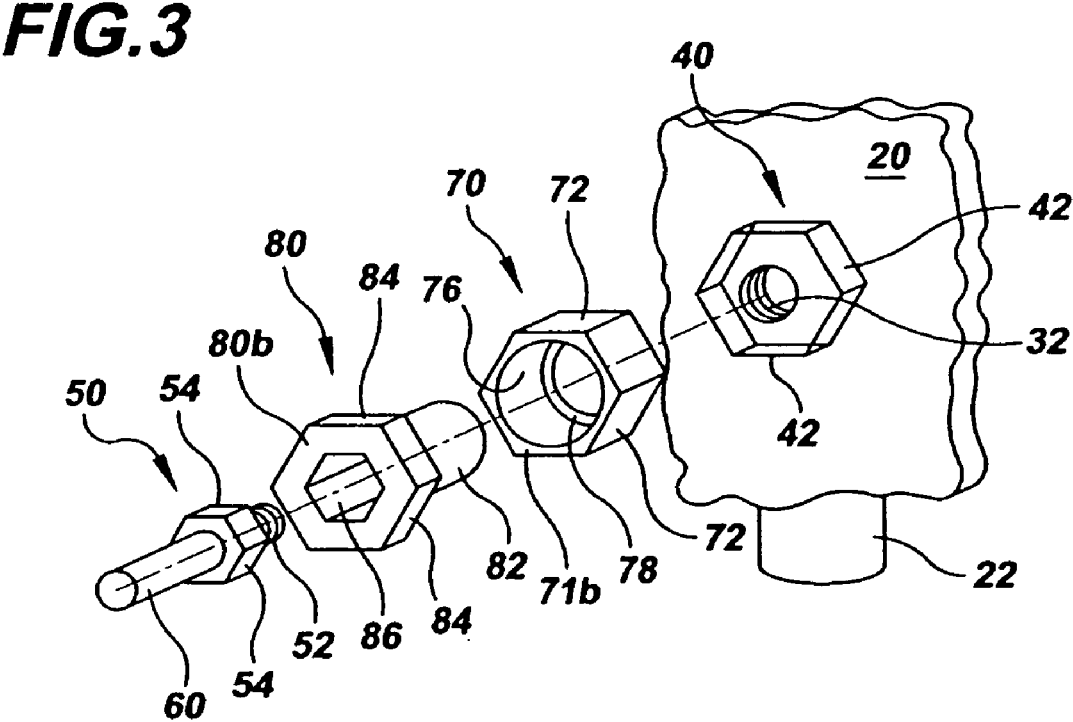
FIG. 3 is a perspective view of the present invention system of FIG. 2.

The preferred fitting aligner system of the present invention consists of two parts which, when assembled together, insure substantially perfect alignment between two threaded fittings when attempting to thread one into the other. As shown in FIGS. 2 and 3, the present invention provides a guide sleeve 70 and a guide member 80 to assist in aligning and engaging the threads of the male and female fastener portions used to connect the oil line to the oil cooler. The material used for the guide sleeve and guide member is preferably nylon 6/6, which has a good operating range, excellent tensile strength, good impact strength and is very machineable. Other materials such as metals and other plastics may also be used. Guide sleeve 70 has an external hex configuration 72 whose end 71a is sized to create a firm, non-rotatable interference fit within the hex flanges 42 of oil cooler nut 40. Although the entire exterior of guide sleeve 70 is shown as having the hex configuration, it is necessary only for the exterior portion near end 71a to have such configuration when used to engage in nut 40. Mating configurations other than a hex configuration may be used. The dimensional sizing is such that an interference fit is achieved to press in and hold end 71a of guide sleeve 70 within nut 40 in a non-rotatable fashion. Guide sleeve 70 has a cylindrically shaped interior surface 76 which is open at end 71b, away from the nut 40, and terminates in inwardly-extending walls 78 at opposite end 71a. Walls 78 are chamfered on end 71a to accommodate any upset material in Palnut 40. The opening between flange 78 should be sufficient for a passage of tubing nut 50.

Guide member 80 has a cylindrically shaped barrel portion 82 and a larger diameter hex head 84 at end 80b configured so that a wrench can grasp it for rotation. Cylindrical surface 82 is correspondingly sized to the cylindrical interior surface 76 of guide sleeve 70 to permit a tight fit which still permits guide member 80 to slide axially and rotate with respect to guide sleeve 70 when inserted therein. The interior surface 86 of guide member 80 is hex-shaped and sized to receive in a sliding fit the hex shaped exterior 54 of tubing nut 50. Preferably, tubing nut 50 may slide through the entire length of guide member 80. The guide member is non-rotatable with respect to the tubing nut about their common longitudinal axes. The dimensional sizing should be such to permit guide member 80, when rotated about its longitudinal axis, to impart a rotational force to tubing nut 50.

To align and connect the oil tubing 60 and tubing nut 50 male fitting to the oil cooler female fitting 32 on the radiator, guide sleeve 70 is inserted into Palnut 40, flange end 71a first, after lining up the hexes of the guide sleeve and Palnut. If necessary, the guide sleeve is lightly tapped with a hammer to bottom it in the Palnut and produce the firm interference fit. Consequently, the guide sleeve can remain inserted in the Palnut for any orientation of the radiator. For example, the guide sleeve may be inserted into the radiator oil cooler fitting when the radiator is out of the vehicle. Either before or after the radiator is installed in the vehicle, end 80a of nut guide 80 is inserted into end 71b of guide sleeve 70.

Once the radiator is installed into the vehicle, the inverted flare fitting 64 and tubing nut 50 on transmission oil line 60 are then inserted into end 80b and through nut guide 80, so that threads 52 on tubing nut 50 contact threads 32 on oil cooler inlet 28. If necessary, a thin screwdriver may be inserted into the space between the tubing and the inside of guide member 80 to apply a slight axial force applied to the end of tubing nut 50 to engage threads 32 of the oil cooler. As guide member 80 is rotated in the proper direction, either by hand or by wrench, the tubing nut and oil cooler threads will fully engage, and an increase in the turning resistance will then occur. Turning guide member 80 imparts rotation to tubing nut 50, and seats the threads of the fitting to make a leak-tight joint without damaging the threads.

Figure 7:
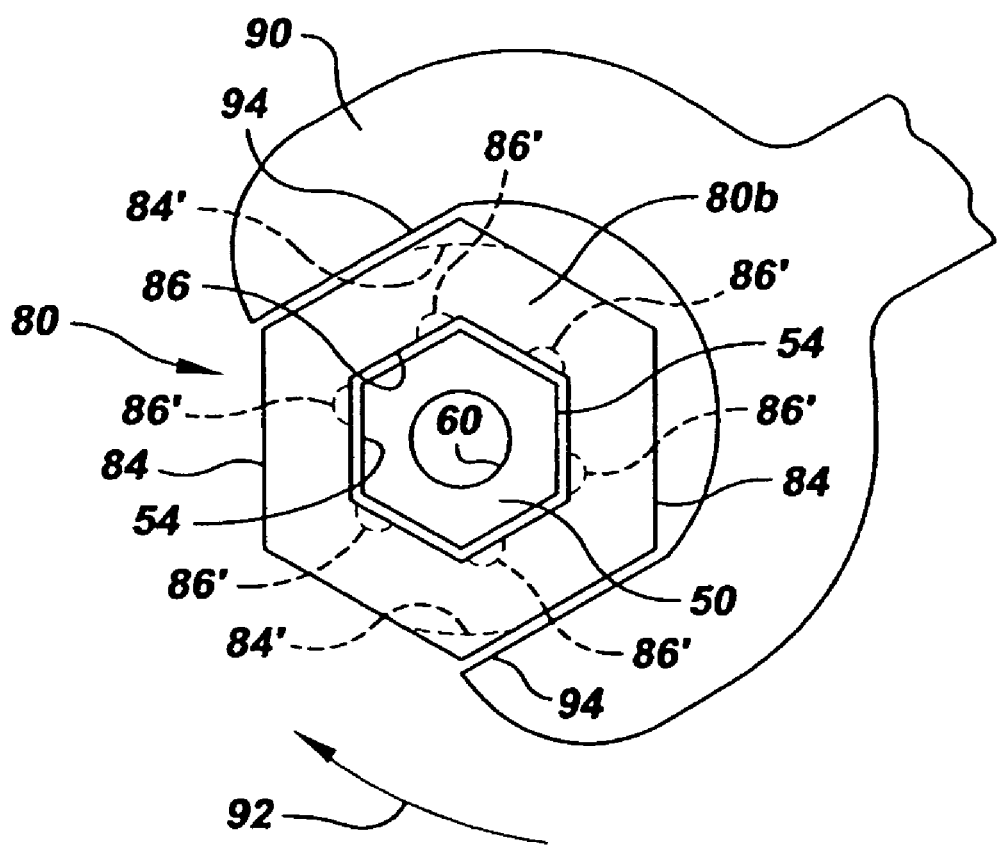
FIG. 7 is an axial end view of a wrench turning the guide member, which turns and tightens the tubing nut of an oil line, in the system shown in FIG. 2.
Figure 8:
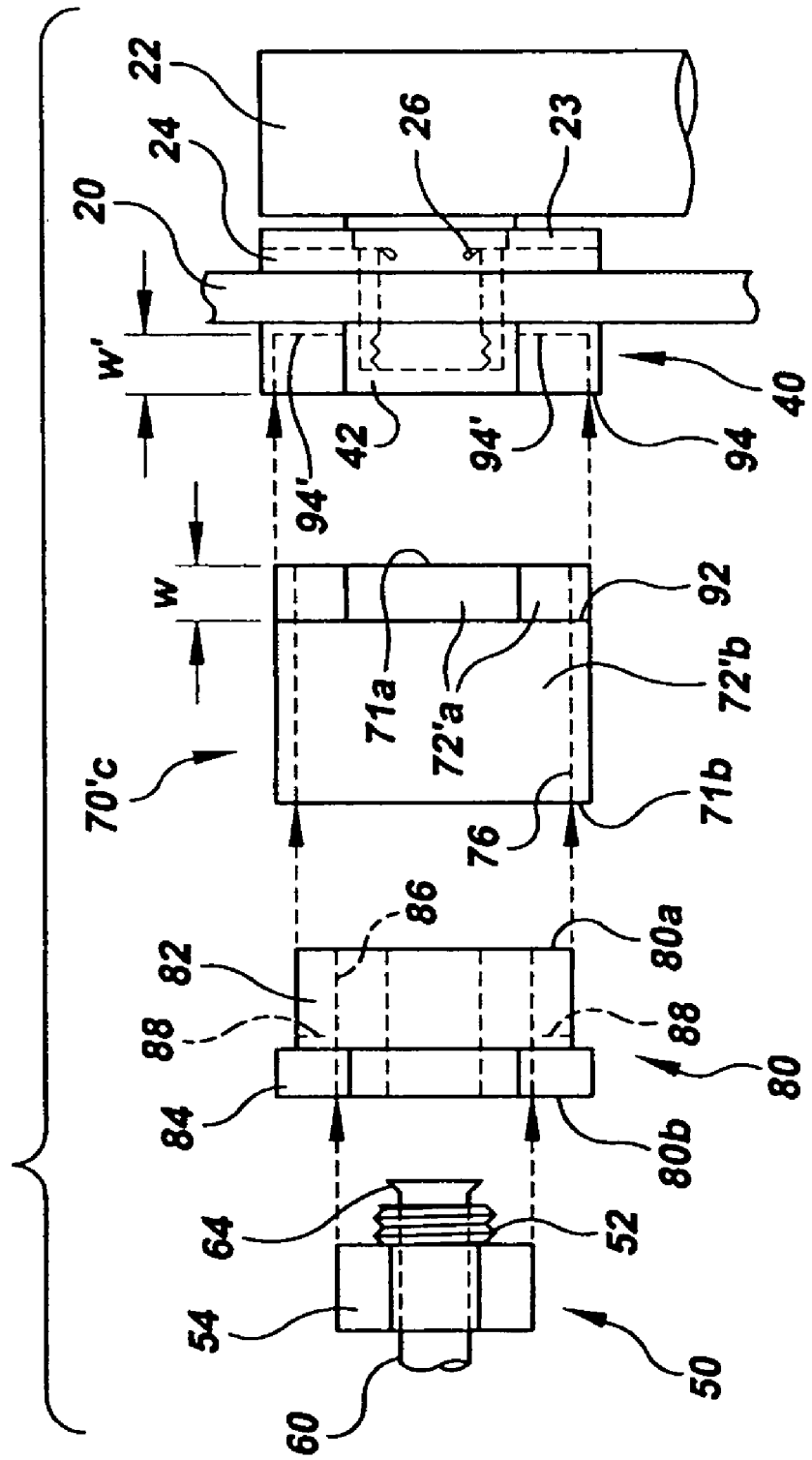
FIG. 8 is a side elevational view, partially in cross-section, of another embodiment of the system shown in FIG. 2.

As shown in FIG. 7, to prevent overtightening, as a standard open-ended wrench 90 turns guide member 80 in direction 92 and seats threads 52 of tubing nut 50 fully within threads 32 on the oil cooler inlet, the hex 84 is sized and configured to distort sufficiently 84' to cause the wrench flats 94 to slip at the critical sealing torque. In an alternate embodiment, the internal hex portion 86 of guide member 80 is sized and configured to distort sufficiently 86' to cause the tubing nut 50 hex-shaped exterior 54 to slip at the critical sealing torque. In both of these embodiments, the hex shapes on the guide member should be made of a softer, more readily deformable material than either the wrench or the tubing nut. Another embodiment of this torque-limiting feature uses a radial undercut 88 made partially through the thickness of material between the exterior hex portion 84 and exterior barrel portion 82 of guide member 80. Barrel portion 82 has sufficient axial length to receive the entirety of tubing nut 50. The remaining material not cut is sized so that it shears when the critical sealing torque is reached, so that hex portion 84 turns freely without imparting any further torque to barrel 82 and tubing nut 50. The appropriate size and material needed for the guide member to achieve the distortion or shearing upon reaching the sealing torque of the tubing nut may be determined without undue experimentation.

The guide member and guide sleeve of the fitting alignment assembly may be left in place during operation of the vehicle so that it may be reused should the replacement radiator need to be removed. Otherwise, the guide member and guide sleeve may be removed by sliding off the opposite end of transmission oil tubing 60.

Figure 4:
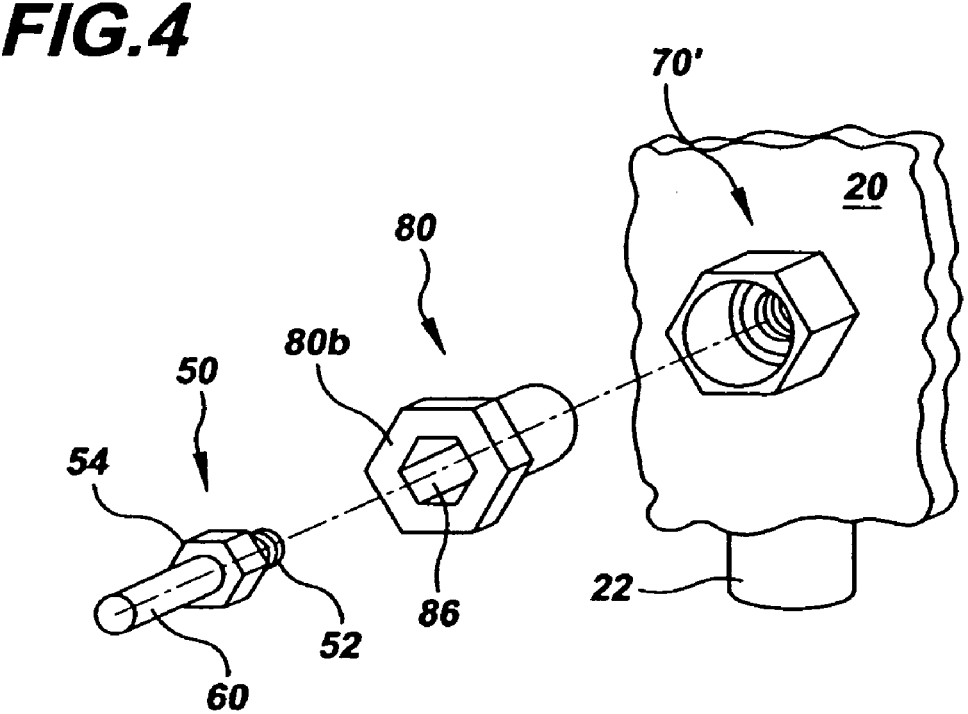
FIG. 4 is a perspective view of a modification of the present invention system of FIGS. 2 and 3.
Figure 5:
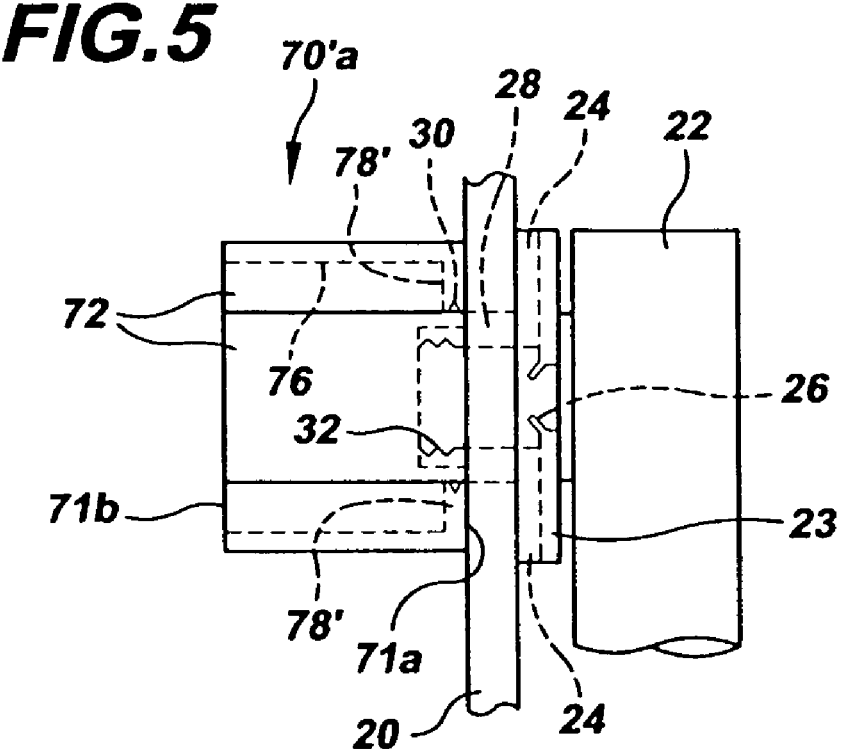
FIG. 5 is a side elevational view, partially in cross-section, of one embodiment of the guide sleeve used in the modified present invention system of FIG. 4.
Figure 6:
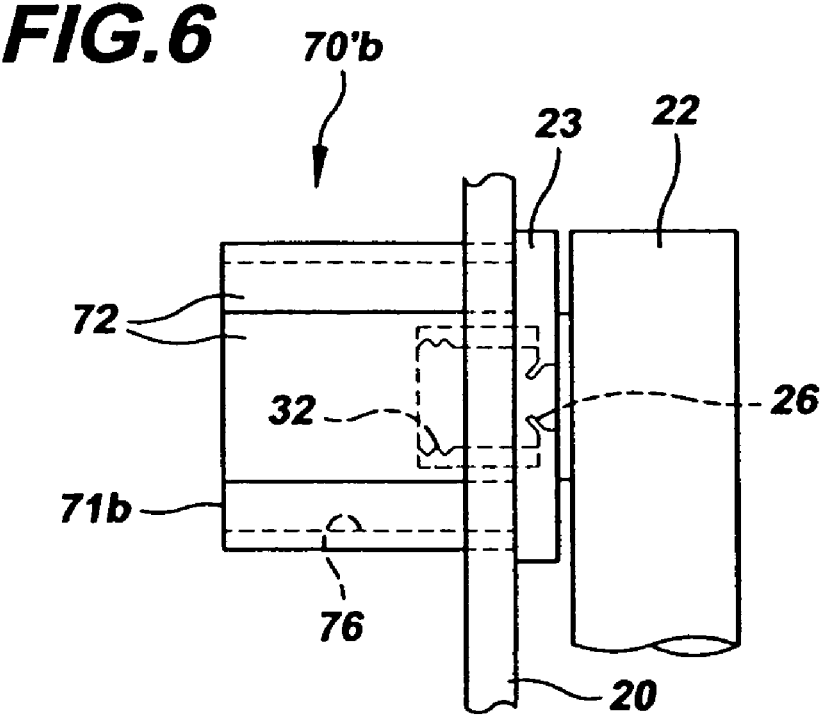
FIG. 6 is a side elevational view, partially in cross-section, of another embodiment of the guide sleeve used in the modified present invention system of FIG. 4.

The embodiments of FIGS. 2 and 3 may be employed for current types of radiator mounted oil coolers, as depicted in FIG. 1. However, modifications may be made, as shown in FIG. 4 where the guide sleeve 70' is not separately mated to oil cooler nut 40. In one embodiment of this modification depicted in FIG. 5, guide sleeve 70'a includes an internal thread within flange 78' at end 71a which mates with external threads 30 of oil cooler extension tube 28. This combines the oil cooler nut and guide sleeve into one piece. A further modification of this guide sleeve 70'a may be made integral with radiator tank wall 20, for example by molding it into the wall of the radiator tank. In another embodiment of the modification of FIG. 4, as shown in FIG. 6 guide sleeve 70'b may be integral with oil cooler flange 23, so that the internal line threads 32 are formed within guide sleeve 70'b. Except for insertion of the guide sleeve to the oil cooler nut, in all other respects the guide member is used with the guide sleeves of FIGS. 4, 5 and 6 in the same manner as previously described.

As discussed in the previous embodiments of the guide sleeve of the present invention, the end of the sleeve may be bottomed into the Palnut to produce an interference fit. This results in contact between the sleeve end 71a and the inside bottom surface of nut 40. In the case of use of a Palnut for nut 40, this inside bottom surface is stamped to produce the internal threads which mate with tube extension external threads 30. Since the stamped internal threads of this inside bottom surface may interfere with the seating of the sleeve end 71a, and consequently the proper alignment of the guide sleeve to provide proper alignment of the guide member and tubing nut with the threads of the oil cooler, another embodiment of the guide sleeve of the present invention is provided to assure proper alignment.

Figure 9:
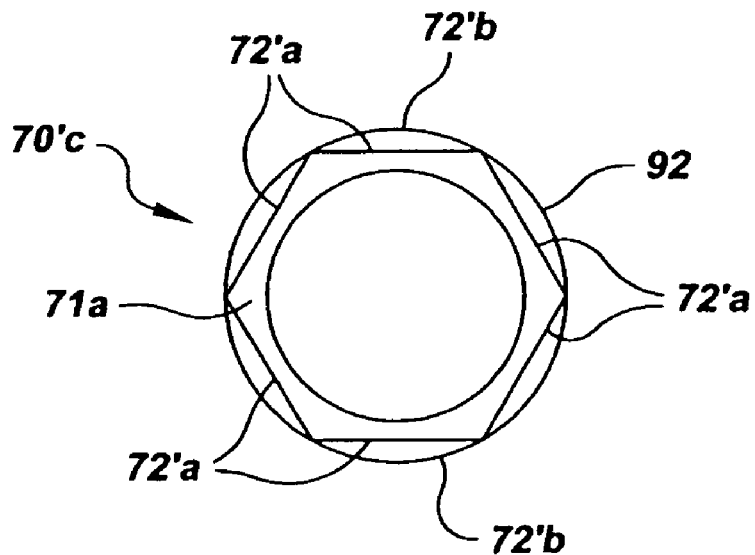
FIG. 9 is a front elevational view of the guide sleeve in the system embodiment of FIG. 8.
Figure 10:
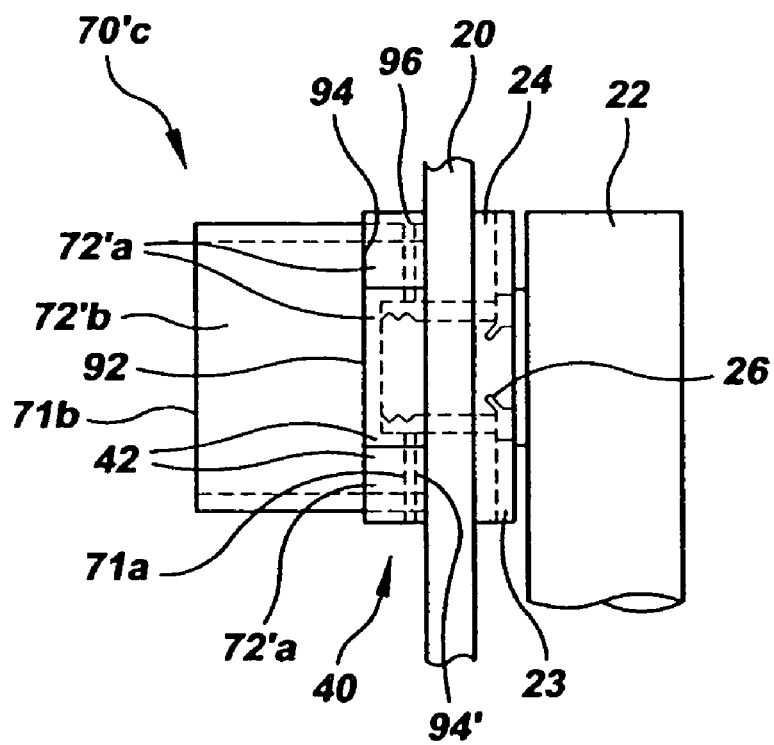
FIG. 10 is a side elevational view, partially in cross-section, of the guide sleeve mounted in the nut in the system embodiment of FIG. 8.
Figure 11:
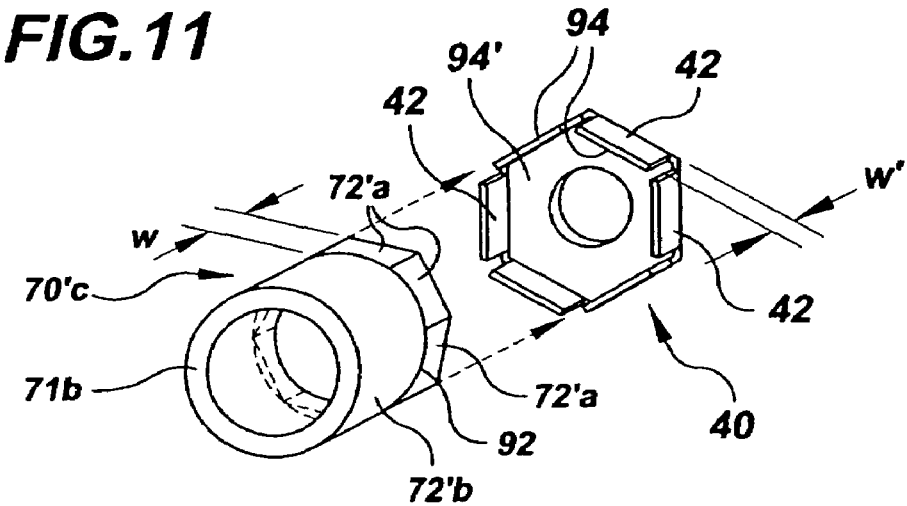
FIG. 11 is an exploded perspective view of the guide sleeve and nut in the system embodiment of FIG. 8.

As shown in FIGS. 8-11, modified guide sleeve 70'c has a generally cylindrical external surface 72'b near end 71b, with the end portion 71a being inserted into the Palnut having a hexagonal exterior surface 72'a sized and configured to fit into the Palnut 40 on the radiator. As seen in FIG. 9, the diameter of the cylindrical surface 72'b is the same as the radial distance between opposed hexagonal corners on guide sleeve hexagonal surface 72'a, and results in a shoulder 92 extending outward from sides of the hex surfaces 72'a between the hexagonal corners. The hexagonal portion 72'a of the guide sleeve 70'c is preferably sized to have a length or a width dimension w slightly less than the distance w' on Palnut 40 between the ends of upturned hexagonal sides 94 and the inside bottom surface 94' of the nut. This allows the outer edge or shoulder 92 between the cylindrical and hexagonal exteriors of the guide sleeve to seat on the top of the upturned hexagonal sides 94 of the Palnut. For best alignment, the tops of the upturned hexagonal sides of the Palnut must be essentially coplanar, and the plane must be perpendicular to the axis of the oil cooler inlet on which it is mounted, so that the axes of the guide sleeve and Palnut/oil cooler inlet are coincident. FIG. 10 shows the resulting gap 96 between sleeve end 71a and inside nut surface 94', which prevents any interference with proper alignment between the Palnut threads and the guide sleeve.

To align and connect oil tubing 60 and the tubing nut 50 male fitting to the end of the oil cooler female fitting 32 on the radiator, the hexagonal end 72'a of guide sleeve 70'c is inserted into the upturned internal hexagonal sides 42 of Palnut 40, lining up the hexagonal portion of the guide sleeve with the hexagonal sides of the Palnut. Shoulder 92 of the guide sleeve seats squarely on the upturned hexagonal sides 94 of the Palnut. The cylindrical portion of the guide member 82 is then inserted into the correspondingly sized cylindrical interior surface 76 of guide sleeve 70'c, with the axes of the guide member and guide sleeve being coincident, and the guide member being rotatable within and with respect to the guide sleeve. The inverted flare fitting 64 and tubing nut 50 on transmission line 60 are then inserted into end 80b and through nut guide 80, so that the axes of the tubing nut and guide member are coincident. Since the axes of the tubing nut and oil cooler inlet held by the Palnut are also now coincident, tubing nut 50 is pushed through opening 86 in guide member 80 until the threads 52 on tubing nut 50 contact threads 32 on oil cooler inlet 28. As guide member 80 is rotated in the proper direction, either by hand or by wrench, the tubing nut and oil cooler threads will fully engage, and an increase in the turning resistance will then occur. Turning guide member 80 imparts rotation to tubing nut 50, and seats the threads of the fitting to make a leak-tight joint without damaging the threads of the tubing nut or the oil cooler.

Figure 12:
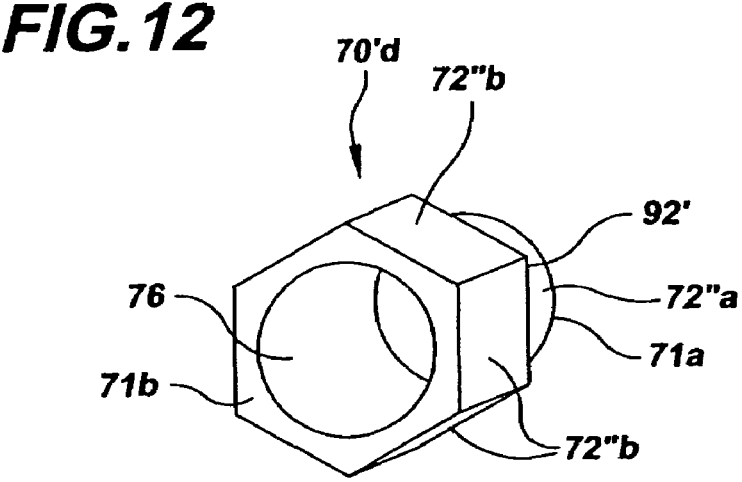
FIG. 12 is a perspective view of a modification of the guide sleeve used in the system embodiment of FIG. 8.
Figure 13:
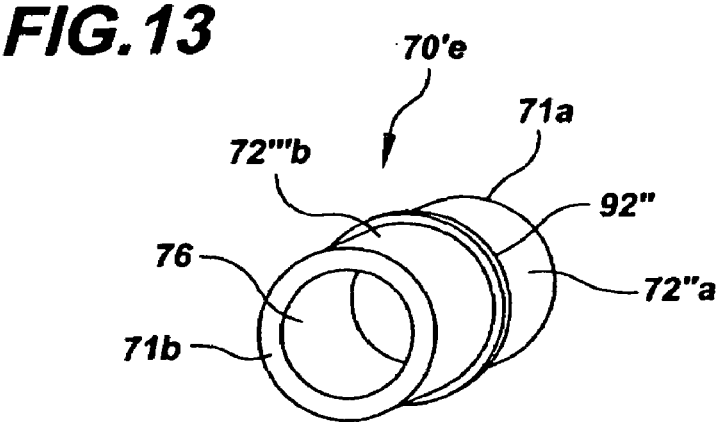
FIG. 13 is a perspective view of another modification of the guide sleeve used in the system embodiment of FIG. 8.

Other external shapes of the guide sleeve 70'c may be used to in the modified embodiment shown in FIGS. 8-11. For example, as shown in FIG. 12 the exterior portion 72"a of guide sleeve 70'd fitting within the Palnut may be cylindrical in shape and form a snug fit within the upturned hexagonal sides of the Palnut. The remaining exterior portion 72"b may be hexagonal or other shape, as long as it extends outward of the surface of the end fitting into the Palnut to form a shoulder 92' where the shape changes axially. FIG. 13 shows another embodiment wherein guide sleeve 70'e again has a cylindrical end 72"a to fit within the Palnut upturned hex sides, but also has a cylindrical surface 72"'b at the opposite end. In this embodiment a ring on the external surface forms a shoulder 92" extending outward of surface 72"a so as to allow the shoulder to seat squarely on the top of the upturned hexagonal sides of the Palnut.

In both embodiments of the guide sleeve shown in FIGS. 12 and 13, the longitudinal distance between the shoulder and end 71a is less than the distance w' on Palnut 40 between the ends of upturned hexagonal sides 94 and the inside bottom surface 94' of the nut so that when the shoulder of the guide sleeve seats on the top of the upturned hexagonal sides of the Palnut, the end of the guide sleeve does not contact the inside bottom surface of the Palnut during assembly and use. Since the cylindrical ends of guide sleeves 70'd and 70'e are not hex shaped, they will not lock into the upturned hex side of the Palnut in a non-rotatable manner. The ends may be sized to provide a tight interference fit to prevent rotation, or the guide sleeve may be secured on its external surface if rotation with respect to the Palnut presents a problem.

Any of the modifications to the guide member described previously may be employed with any of the guide sleeve embodiment of FIGS. 8-13.

In all embodiments shown, the male or female nature of the threads on the tubing nut 50 and oil cooler extension 28 are not critical, and female threads may be used on the tubing nut and male threads may be used on the oil cooler extension 28, if such are employed on the fittings to be aligned and connected.

The present invention therefore achieves the objects set forth above and provides a method and system to establish and maintain near perfect alignment between such male and female threaded fittings. The instant invention is particularly useful for replacement radiators that must be installed in a vehicle when the engine and other components are already installed, and working space is limited. The invention may also be used in assembly lines for new installations. The invention essentially eliminates the possibility of cross threading, which damages the fitting threads necessitating the replacement of the fitting.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of aligning and connecting a threaded male fastener to a correspondingly threaded female fastener comprising:
   providing one of the threaded male fastener or correspondingly threaded female fastener with a nut having a plurality of upturned sides and a central axis aligned with a central axis of the one of the male or female fastener;
   providing a guide sleeve having a cylindrical internal surface and a central axis and an end sized to fit within the upturned sides of the nut;
   providing the other of the threaded male fastener or correspondingly threaded female fastener with a guide member having a cylindrical external surface and a central axis aligned with a central axis of the other of the male or female fastener, the guide member cylindrical external surface being slidingly and rotatably movable with respect to the guide sleeve cylindrical internal surface;
   aligning the guide sleeve central axis with a central axis of the one of the male or female fastener nut and inserting the end of the guide sleeve into the nut so that the guide sleeve end fits within the upturned sides of the nut;
   sliding the guide member into the guide sleeve, such that the threaded male and female fasteners are coaxially aligned; and
   rotating the guide member with respect to the guide sleeve so that the threads of the male fastener engage threads of the female fastener.

2. The method of claim 1 wherein the guide sleeve end is shaped to fit within the upturned sides of the nut, and is non-rotatably secured to the nut.

3. The method of claim 2 wherein the guide sleeve end and the upturned sides of the nut are hexagonal.

4. The method of claim 1 wherein the nut has an inside bottom surface between the upturned sides, and the guide sleeve end contacts the inside bottom surface when the end of the guide sleeve is inserted into the nut.

5. The method of claim 1 wherein the upturned sides of the nut have a top, and the guide sleeve has a shoulder on an external surface near the end to be fitted within the upturned sides of the nut, and wherein the guide sleeve shoulder contacts the top of the upturned sides of the nut when the end of the guide sleeve is inserted into the nut.

6. The method of claim 5 wherein the nut has an inside bottom surface between the upturned sides and the guide sleeve has a length between the shoulder and the end to be fitted within the upturned sides of the nut less than the distance between the top of the upturned sides of the nut and the inside bottom surface of the nut.

7. The method of claim 1 wherein the guide sleeve end is cylindrical.

8. The method of claim 1 wherein the guide sleeve has a hexagonal external surface opposite the end to be fitted within the upturned sides of the nut.

9. The method of claim 1 wherein the guide sleeve has a cylindrical external surface opposite the end to be fitted within the upturned sides of the nut.

10. The method of claim 1 wherein the guide sleeve has a ring extending from an external surface thereof to contact the top of the upturned sides of the nut when the end of the guide sleeve is inserted into the nut.

11. A system of aligning and connecting a threaded male fastener to a correspondingly threaded female fastener comprising:
    a nut having a plurality of upturned sides and a central axis aligned with a central axis of one of the male or female fastener;
    a guide sleeve having a cylindrical internal surface and a central axis and an end sized to fit within the upturned sides of the nut; and
    a guide member having a cylindrical external surface and a central axis aligned with a central axis of the other of the male or female fastener, the guide member cylindrical external surface being slidingly and rotatably movable with respect to the guide sleeve cylindrical internal surface,
    wherein the guide sleeve end is adapted to be fitted within the upturned sides of the nut and the guide member is adapted to be slid into the guide sleeve, such that the threaded male and female fasteners are coaxially aligned and contacted, and wherein the guide member may be rotated with respect to the guide sleeve so that threads of the male fastener engage threads of the female fastener.

12. The system of claim 11 wherein the guide sleeve end is shaped to fit within the upturned sides of the nut, and is adapted to be non-rotatably secured to the nut.

13. The system of claim 12 wherein the guide sleeve end and the upturned sides of the nut are hexagonal.

14. The system of claim 11 wherein the nut has an inside bottom surface between the upturned sides, and the guide sleeve end is adapted to contact the inside bottom surface when the end of the guide sleeve is inserted into the nut.

15. The system of claim 11 wherein the upturned sides of the nut have a top, and the guide sleeve has a shoulder on an external surface near the end to be fitted within the upturned sides of the nut, and wherein the guide sleeve shoulder is adapted to contact the top of the upturned sides of the nut when the end of the guide sleeve is inserted into the nut.

16. The system of claim 15 wherein the nut has an inside bottom surface between the upturned sides and the guide sleeve has a length between the shoulder and the end to be fitted within the upturned sides of the nut less than the distance between the top of the upturned sides of the nut and the inside bottom surface of the nut.

17. The system of claim 11 wherein the guide sleeve end is cylindrical.

18. The system of claim 11 wherein the guide sleeve has a hexagonal external surface opposite the end adapted to be fitted within the upturned sides of the nut.

19. The system of claim 11 wherein the guide sleeve has a cylindrical external surface opposite the end adapted to be fitted within the upturned sides of the nut.

20. The system of claim 11 wherein the guide sleeve has a ring extending from an external surface thereof to contact the top of the upturned sides of the nut when the end of the guide sleeve is inserted into the nut.

* * * * *

UNITED STATES PATENT AND TRADEMARK OFFICE
CERTIFICATE OF CORRECTION

PATENT NO. : 7,647,683 B1
APPLICATION NO. : 11/239487
DATED : January 19, 2010
INVENTOR(S) : Arnold Marcus It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this

Twenty-eighth Day of December, 2010

David J. Kappos
*Director of the United States Patent and Trademark Office*